United States Patent
Morgott

(10) Patent No.: US 9,635,928 B2
(45) Date of Patent: May 2, 2017

(54) TOOTHBRUSH COMPRISING ELASTOMERIC CLEANING ELEMENTS OVER-MOLDED WITH A HARDER PLASTIC AND METHOD FOR PRODUCING THE SAME

(71) Applicant: Braun GmbH, Kronberg (DE)

(72) Inventor: Markus Morgott, Kronberg (DE)

(73) Assignee: The Procter & Gamble Company, Cincinnati, OH (US)

(*) Notice: Subject to any disclaimer, the term of this patent is extended or adjusted under 35 U.S.C. 154(b) by 669 days.

(21) Appl. No.: 14/060,640

(22) Filed: Oct. 23, 2013

(65) Prior Publication Data
US 2014/0123423 A1    May 8, 2014

(30) Foreign Application Priority Data
Nov. 5, 2012   (EP) .................................... 12191225

(51) Int. Cl.
| | | |
|---|---|---|
| A46B 3/00 | (2006.01) | |
| A46B 3/22 | (2006.01) | |
| A46B 9/04 | (2006.01) | |
| A46B 9/06 | (2006.01) | |
| A46D 3/00 | (2006.01) | |
| A46D 1/00 | (2006.01) | |

(Continued)

(52) U.S. Cl.
CPC ............... *A46B 9/04* (2013.01); *A46B 3/005* (2013.01); *A46B 3/22* (2013.01); *A46B 9/06* (2013.01); *A46B 9/065* (2013.01); *A46D 1/023* (2013.01); *A46D 1/0207* (2013.01); *B29C 45/14385* (2013.01); *A46B 2200/1066* (2013.01); *A46D 3/005* (2013.01); *B29C 45/1671* (2013.01); *B29L 2031/425* (2013.01)

(58) Field of Classification Search
CPC .............. A46B 9/04; A46B 9/06; A46B 9/065
See application file for complete search history.

(56) References Cited

U.S. PATENT DOCUMENTS

| | | |
|---|---|---|
| 5,750,062 A | 5/1998 | Tsukamoto |
| 5,800,751 A | 9/1998 | Barker |

(Continued)

FOREIGN PATENT DOCUMENTS

| | | |
|---|---|---|
| DE | 3307592 A1 | 10/1983 |
| DE | 19520540 A1 | 12/1996 |

(Continued)

OTHER PUBLICATIONS

European Search Report for EP 12 19 1225 dated Apr. 19, 2013.

*Primary Examiner* — Randall Chin
(74) *Attorney, Agent, or Firm* — Alexandra S. Anoff

(57) ABSTRACT

A toothbrush is disclosed. The toothbrush includes a brush head including one or more cleaning elements; a handle; and a neck connecting the brush head and the handle. The one or more cleaning elements include at least one or more elastomeric cleaning elements having a first plastic material and one or more bristle tuft cleaning elements. The at least one or more cleaning elements are embedded into a second plastic material by over-molding. The Shore hardness of the second plastic material is greater than the Shore hardness of the first plastic material and the brush head is formed from the second plastic material during over-molding of the one or more cleaning elements.

12 Claims, 7 Drawing Sheets

(51) Int. Cl.
B29C 45/14 (2006.01)
*B29L 31/42* (2006.01)
*B29C 45/16* (2006.01)

(56) References Cited

U.S. PATENT DOCUMENTS

| | | | |
|---|---|---|---|
| 5,970,564 A * | 10/1999 | Inns | A46B 7/06 |
| | | | 15/167.1 |
| 6,353,958 B2 | 3/2002 | Weihrauch | |
| 6,886,207 B1 * | 5/2005 | Solanki | A46B 9/028 |
| | | | 15/110 |
| 7,594,293 B2 * | 9/2009 | Xi | A46B 9/005 |
| | | | 15/110 |
| 2002/0166990 A1 | 11/2002 | Yang | |
| 2003/0206985 A1 | 11/2003 | Gedritis et al. | |
| 2004/0021245 A1 | 2/2004 | Jang | |
| 2006/0288507 A1 | 12/2006 | Hohlbein et al. | |
| 2007/0283518 A1 * | 12/2007 | Blanchard | A46B 9/025 |
| | | | 15/167.1 |
| 2010/0107826 A1 | 5/2010 | Gauthier et al. | |
| 2011/0000041 A1 | 1/2011 | Vitt et al. | |
| 2011/0061189 A1 | 3/2011 | Meadows et al. | |
| 2012/0246857 A1 | 10/2012 | Kato et al. | |

FOREIGN PATENT DOCUMENTS

| | | |
|---|---|---|
| DE | 19752786 A1 | 6/1998 |
| DE | 19927980 A1 | 12/2000 |
| DE | 10041812 A1 | 3/2001 |
| DE | 10034839 A1 | 1/2002 |
| DE | 10054714 B4 | 9/2005 |
| DE | 102004014536 A1 | 10/2005 |
| DE | 102005033905 A1 | 1/2007 |
| DE | 102008046840 A1 | 4/2009 |
| EP | 110478 A1 | 6/1984 |
| EP | 636465 A1 | 2/1995 |
| EP | 078443 B1 | 12/1999 |
| EP | 0907484 B1 | 2/2001 |
| EP | 1239266 A2 | 9/2002 |
| EP | 1422040 B1 | 10/2006 |
| EP | 1745912 A1 | 1/2007 |
| EP | 2144740 A1 | 1/2010 |
| JP | H05-50463 | 3/1993 |
| JP | 2009-506796 | 2/2009 |
| JP | 2010-524625 | 7/2010 |
| JP | 2012-148020 | 8/2012 |
| WO | WO 96/10934 A1 | 4/1996 |
| WO | WO 00/64306 A1 | 11/2000 |
| WO | WO 02/06034 A1 | 1/2002 |
| WO | WO 2006/002804 A1 | 1/2006 |
| WO | WO 2007/009738 A1 | 1/2007 |
| WO | WO 2009/049435 A1 | 4/2009 |
| WO | WO 2009/130146 A1 | 10/2009 |
| WO | WO 2009/135997 A1 | 11/2009 |
| WO | WO 2010/028549 A1 | 3/2010 |
| WO | WO 2012/093085 A2 | 7/2012 |

* cited by examiner

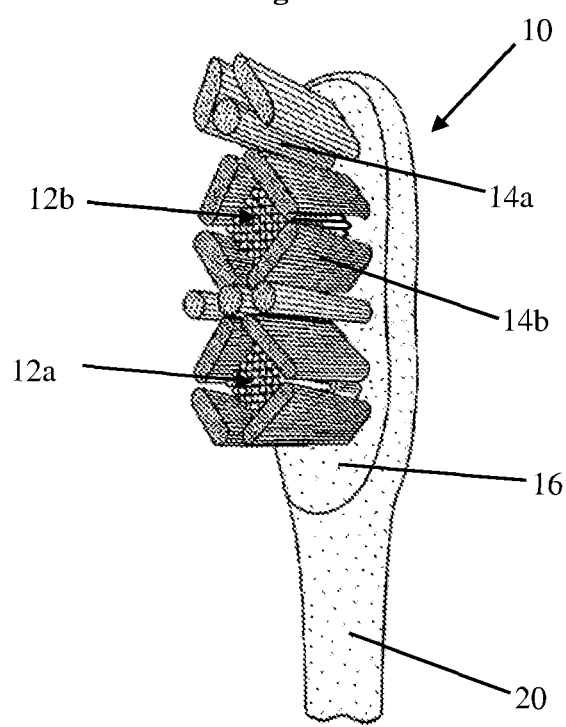

TOOTHBRUSH COMPRISING ELASTOMERIC CLEANING ELEMENTS OVER-MOLDED WITH A HARDER PLASTIC AND METHOD FOR PRODUCING THE SAME

FIELD OF THE INVENTION

The present disclosure relates to a method for producing a brush head. More particularly, the present disclosure relates to a method for producing a toothbrush head or a part thereof which includes elastomeric cleaning elements and bristle tuft cleaning elements with high design flexibility.

BACKGROUND OF THE INVENTION

Several manufacturing techniques are known in order to produce brushes, in particular toothbrushes. A key issue is how to fasten the cleaning elements in the brush head. Conventionally, brush heads were produced by injection molding providing a plurality of blind ended tuft holes wherein the bristle tufts were fastened in a U-shape form by metal anchors. Anchor-free or hot-tufting methods fasten the cleaning elements in the brush head by means of a forming technique. Usually, the bristle tufts are melted at their ends to form thickenings in order to increase the pull-out resistance of the tufts. These thickenings can be over-molded with a plastic material to form a brush head or part thereof.

Nowadays, cleaning element fields of brush heads, in particular toothbrush heads comprise elastomeric elements. These elastomeric elements might be produced completely from elastomeric material or they might comprise a core from a hard plastic material (US2012/0246857A1). Usually, the elastomeric elements are formed by injection molding techniques and might be mounted to the brush head using stapling (US2012/0246857A1), clipsing or any other snap and fit connection (US2011/0000041A1). Alternatively, the elastomeric cleaning elements are formed together with other elastomeric parts on the surface of the brush or the brush head itself (US2011/0061189). For example, a brush head can be over-molded with an elastomeric material forming a tongue cleaner on the backside of the brush head and elastomeric cleaning elements on the front side, i.e. the brushing side of the brush head. However, due to adhesion and geometric requirements the design flexibility for said kind of cleaning element fields is relatively low. Elastomeric cleaning elements have to be made from the same material as the tongue cleaner or other elastomeric elements on the brush, namely the gripping faces or some design elements in the area of the brush neck or the handle. Further, the elastomeric cleaning elements are arranged at the outer surface of the cleaning element field due to the geometric restriction during the over-molding process. Thus, there is a need for a method of manufacturing toothbrushes comprising elastomeric cleaning elements with greater design flexibility, regarding the arrangement of the elastomeric cleaning elements and the material which can be used.

SUMMARY OF THE INVENTION

In one embodiment, a toothbrush is provided. The toothbrush includes a brush head including one or more cleaning elements; a handle; and a neck connecting the brush head and the handle. The one or more cleaning elements include at least one or more elastomeric cleaning elements having a first plastic material and one or more bristle tuft cleaning elements. The at least one or more cleaning elements are embedded into a second plastic material by over-molding. The Shore hardness of the second plastic material is greater than the Shore hardness of the first plastic material and the brush head is formed from the second plastic material during over-molding of the one or more cleaning elements.

In another embodiment, a method for producing a toothbrush head is provided. The method includes the steps of providing a cleaning element carrier including one or more cavities suitable to receive one or more cleaning elements, the one or more cavities representing one or more first molding cavities suitable to form an elastomeric cleaning element therein, and the cleaning element carrier representing a first half of a second molding cavity suitable to form the toothbrush head therein; providing one or more bristle tufts in at least one of the one or more cavities; injecting a first plastic material into at least one of the one or more cavities to form the at least one elastomeric cleaning element therein, the at least one cavity receiving the injected first plastic material being different from the at least one cavity providing the one or more bristle tufts; providing a second half of the second molding cavity and combining the second half of the second molding cavity with the cleaning element carrier to form the second molding cavity; and injecting a second plastic material into the second molding cavity to form the toothbrush head. The one or more bristle tufts and the at least one elastomeric cleaning element are over-molded with the second plastic material and the Shore hardness of the second plastic material is greater than the Shore hardness of the first plastic material.

These and other features, aspects and advantages of specific embodiments will become evident to those skilled in the art from a reading of the present disclosure.

BRIEF DESCRIPTION OF THE DRAWINGS

The embodiments set forth in the drawings are illustrative in nature and not intended to limit the invention defined by the claims. The following detailed description of the illustrative embodiments can be understood when read in conjunction with the following drawings, where like structure is indicated with like reference numerals and in which:

FIG. 5C shows a schematic perspective representation of the toothbrush head shown in FIG. 5A.

DETAILED DESCRIPTION OF THE INVENTION

Figure 1:
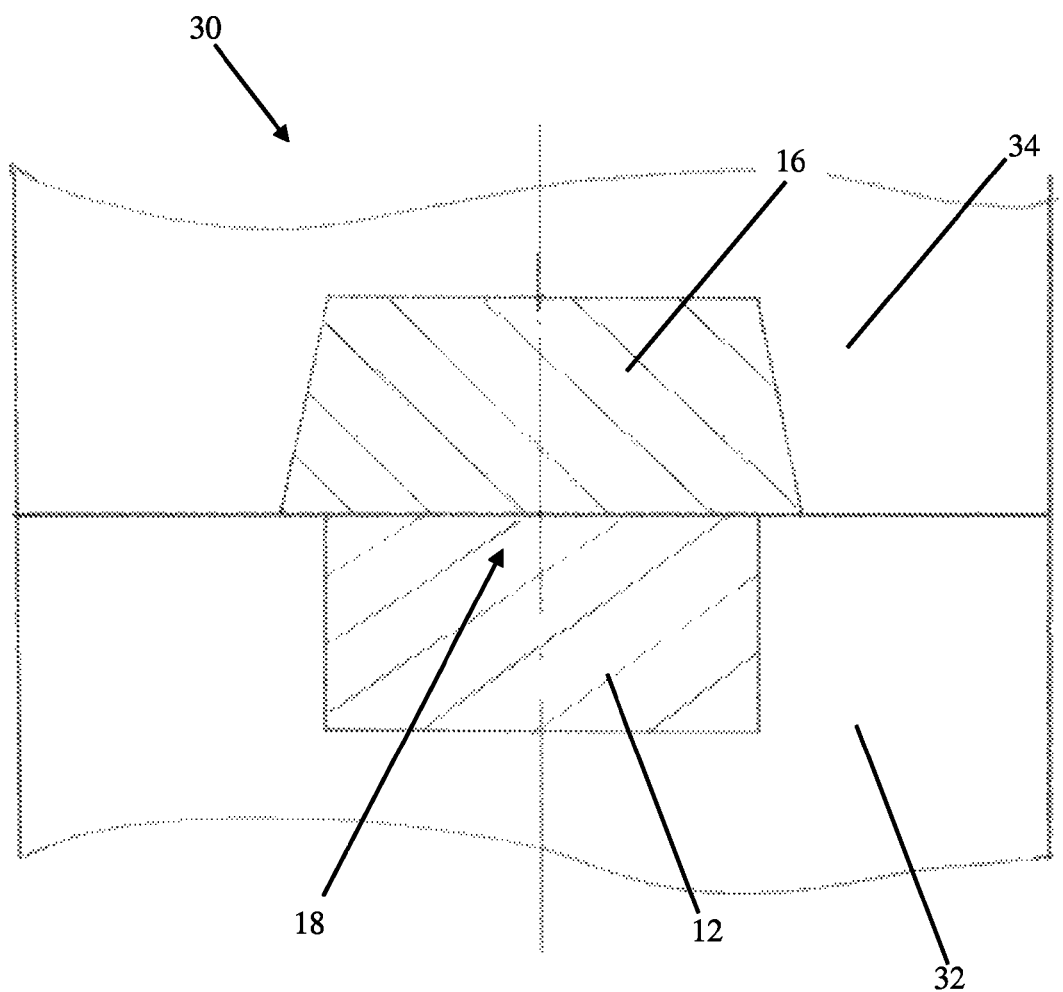
FIG. 1 shows a schematic side view of an injection mold forming a cavity for a first plastic mold part which is over-molded with a second plastic material to form a multi-component plastic mold part according to embodiments shown and described herein.

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims All publications and patents cited herein are incorporated herein by reference.

The brush head and the method for the production thereof as disclosed herein allow design flexibility, for example, in the positioning of the elastomeric cleaning elements and the choice of the material used for the elastomeric cleaning elements as well as the material used to form the brush head.

There is provided a method for producing such a brush head, in particular such a toothbrush head or a part thereof, wherein elastomeric cleaning elements are produced and are over-molded with the material used for the brush head or a part thereof. The toothbrush includes a brush head providing one or more cleaning element(s), a handle and a neck connecting the brush head and the handle to each other, wherein the one or more cleaning element(s) comprise at least one elastomeric cleaning element consisting of a first plastic material and at least one bristle tuft cleaning element.

"Elastomeric cleaning element(s)" as used herein shall be understood as any type or form of cleaning element(s) made from a first plastic material, wherein the first plastic material shows elastomeric properties. Suitable first plastic materials showing elastomeric properties which may be used to form said elastomeric cleaning element(s) are, for example, rubber, polypropylene (PP) or thermoplastic elastomers (TPE).

In one embodiment a thermoplastic elastomer is used as first plastic material. The Shore A hardness of the first plastic material may be in the range from about 10 to about 80, or in another embodiment, in the range from about 20 to about 70, or in another embodiment, in the range from about 30 to about 50, or in yet another embodiment, in the range from about 30 to about 40. In one embodiment the first material may be a thermoplastic elastomer having a Shore A hardness of about 35. The Shore a hardness chosen for the elastomeric cleaning elements depends on the geometry used. Thinner elastomeric cleaning elements can be produced from an elastomer having a greater Shore A hardness compared to thicker elastomeric cleaning elements. The choice of the elastomeric material also depends on the length of the elastomeric cleaning elements. In principle, longer elastomeric cleaning elements may be manufactured from an elastomer having a greater Shore A hardness compared to shorter elastomeric cleaning elements.

In addition or alternatively, the elastomeric cleaning element(s) may have any geometric form. An elastomeric cleaning element may be for example, a nub, a pin, a fin, a wall, a bar, a gutter, a curve, a circle, a lamella, a textured element, a polishing element such as, for example, a polishing cup, or a tongue cleaning element or a combination thereof. More than one elastomeric cleaning element(s) can be combined to a plurality of elastomeric cleaning elements. The plurality of elastomeric cleaning elements may include a common base to which all elastomeric cleaning elements are connected. The common base includes one surface comprising the elastomeric cleaning elements and one surface to be over-molded with the second plastic material. The surface including the elastomeric cleaning elements may be mainly unstructured in order to achieve a hygienic and easy to clean surface. The surface to be over-molded may be mainly unstructured or structured. In addition or alternatively, the surface to be over-molded may include protrusions, projections, hooks, depressions, or any other geometric form which may increase the bonding strength between the first and the second plastic material. These geometric forms may be formed in such that under-cuts are formed during the over-molding of the first plastic material with the second plastic material. In addition or alternatively, the common base may be a layer made from the first plastic material to which the plurality of elastomeric cleaning elements is attached. The common base and the elastomeric cleaning elements may be produced together in one common injection step or may be produced separately and combined afterwards to form one elastomeric cleaning structure.

The at least one elastomeric cleaning element is over-molded with a second plastic material, wherein the Shore hardness of the second plastic material is greater than the Shore hardness of the first plastic material. The Shore hardness of the second plastic material may be significantly greater than the Shore hardness of the first plastic material. The shore D hardness of the second plastic material may be in the range from about 30 to about 90, or in another embodiment, in the range from about 40 to about 80, or in another embodiment, in the range from about 50 to about 80, or in another embodiment, in the range from about 65 to about 75. Suitable materials which may be used as second plastic material may be for example, polypropylene (PP), polyethylene (PE), polyoxymethylene (POM), polyethyleneterephthalate (PET), a polyamide (PA), or a blend or a mixture comprising polypropylene, polyethylene, polyoxymethylene, polyethyleneterephthalate or a polyamide.

As disclosed herein the brush head of the toothbrush is formed at least partially during over-molding of the first plastic material with the second plastic material. That means the at least one elastomeric cleaning element is connected to the brush head via the second plastic material. The second plastic material may be injected into any geometric form as long as it is smaller or identical to the geometric form of the toothbrush head. For example, the part of the toothbrush head formed from the second plastic material may be a plate having the outline of the brush head, a plate having a similar, but smaller outline of the brush head or any other form fitting into the outline of the brush head.

More than one elastomeric cleaning element(s) may include a common base which shows a contact surface to the second plastic material or the elastomeric cleaning elements may be embedded into the second plastic material individually. If the elastomeric cleaning elements are embedded individually into the second plastic material, each elastomeric cleaning element may include a material thickening at the end to be over-molded. The thickenings may be embedded and represent a mechanical barrier against extraction force or the thickening may provide material which can be molten during the over-molding process to form a mixed contact zone comprising the first and the second plastic material. If the elastomeric cleaning elements are embedded into the second plastic material by a common base the contact surface of the common base may be molten during injection of the second plastic material. Due to the over-molding of the softer/less hard first plastic material with the harder second plastic material small toothbrush heads can be formed without losing the adhesive strength between the elastomeric cleaning element(s) and the brush head itself. The toothbrush as disclosed herein may show a brush head thickness of less than about 5 mm, or less than about 4 mm, or less than about 3 mm, or less than about 2 mm.

The toothbrush as disclosed herein may include in addition to the elastomeric cleaning element(s) one or more cleaning element(s) including one or more bristle tuft(s). "Bristle tuft" as used herein shall be understood as any type, form or arrangement including individual bristle filaments. Bristle filaments may include natural materials, plastics or plastic mixtures. A plastic which can be used to form bristle filaments is for example, a polyamide (PA), a polybutylterephthalate (PBT), a polyethylterephthalate (PET), or mixtures thereof. More than one bristle filaments are grouped to form a bristle tuft. The bristle tuft may include a thickening at one tuft end, wherein the thickening can be formed by melting the bristle ends. The tuft end opposite to the thickening is the end to be intended to clean the teeth. The ends of the bristles intended to clean may be cut into a special profile, may be tapered, may be end-rounded and may be polished in order to provide a safe and comfortable bristle tuft, which does not hurt the soft tissue in the mouth. The bristle tuft(s) may be embedded into the second plastic material. Thereby the second plastic material flows around the thickening at the tuft end thereby fastening the bristle tuft(s) into the second material securely.

The toothbrush as disclosed herein may include, in addition to the elastomeric cleaning element(s) and/or the bristle tuft(s), one or more cleaning element(s) including mixed tufts. "Mixed tuft" as used herein shall be understood as any type, form or arrangement of cleaning elements including elastomeric cleaning element(s) and bristle (tuft) filaments. Thereby, the bristle filaments may be arranged around and/or inside an elastomeric element. An example for an arrangement around an elastomeric element may be an elastomeric nub, an elastomeric pin, an elastomeric fin, an elastomeric wall, an elastomeric bar, an elastomeric gutter, an elastomeric curve, an elastomeric circle, an elastomeric lamella, an elastomeric textured element or an elastomeric polishing element which outline is surrounded by a corresponding outline made by bristle filaments or bristle tufts. The outline of the elastomeric cleaning element may be surrounded completely or partially by the bristle filament(s) or bristle tuft(s). An example for an arrangement inside of an elastomeric element may be an elastomeric cup or other open structure, wherein in the cavity of the cup bristle filament(s) or bristle tuft(s) are arranged. In addition or alternatively, the mixed tuft(s) may include both bristle filaments or bristle tufts being arranged inside of the elastomeric cleaning element and bristle filaments or bristle tufts being arranged at the outline of the elastomeric cleaning element.

In addition or alternatively, there is provided a method for producing a toothbrush as disclosed herein. The method includes the step of providing one end of one or more bristle tuft(s) in one or more cavity(ies) of a cleaning element carrier, wherein the one or more cavity(ies) represent one or more molding cavity(ies) which are suitable to form elastomeric cleaning element(s) therein. That means the one or more cavity(ies) of the cleaning element carrier are used to provide bristle tuft(s) or are used to form elastomeric cleaning element(s) therein using injection molding. The bristle tuft(s) may be provided into the cavities of the cleaning element carrier before the elastomeric cleaning elements are formed in the remaining cavities not providing bristle tuft(s) or after injecting the elastomeric cleaning elements. If the elastomeric cleaning elements are injected first, the cavities intended to provide bristle tufts have to be covered against the first plastic material. In addition, the cleaning element carrier itself represents a first part of a second molding cavity to form the brush head or the part thereof therein.

The cleaning element carrier may provide the end(s) of the one or more bristle tuft(s) in such that the ends to be embedded into the brush head or the part thereof protrude from the cavities of the cleaning element carrier and the ends intended to clean are covered by the cleaning element carrier. The distance from the surface of the cleaning element carrier to the ends to be embedded by over-molding is adjusted big enough to fasten the bristle tuft(s) securely into the brush head. In addition, the surface of the cleaning element carrier providing the bristle tuft(s) represents a part of the molding cavity of the brush head. The surface of the brush head providing the cleaning elements is the negative of the surface of the cleaning element carrier providing the cleaning elements into the molding cavity.

The cavities of the cleaning element carrier may be blind holes into which the first plastic material may be injected directly in order to produce the elastomeric cleaning elements. Thus, the method for producing a toothbrush head further comprises the step of injecting a first plastic material into the molding cavity(ies) intended to comprise the at least one elastomeric cleaning element. Thereby, the blind hole(s) represent molding cavity(ies) for the elastomeric cleaning element(s), wherein the shape of the blind hole(s) defines the outer surface of the elastomeric cleaning element(s). In one embodiment, the elastomeric cleaning element(s) are injected into the cleaning element carrier before the bristle tuft(s) are inserted into it. In another embodiment, the elastomeric cleaning element(s) are injected into the cleaning element carrier after the bristle tuft(s) are inserted into it. In addition or alternatively, the elastomeric cleaning element(s) may be injected in a first cleaning element carrier and may be transferred to a second cleaning element carrier, wherein the bristle tuft(s) may be inserted into said second cleaning element carrier before the elastomeric cleaning element(s), simultaneously or afterwards. Any geometric form of elastomeric cleaning element(s) may be produced by the method disclosed herein as long as the geometric form can be produced by injection molding.

The method for producing a toothbrush head further includes the step of injecting a second plastic material to form the brush head or a part of it. Thereby the one or more bristle tuft(s) and the at least one elastomeric cleaning element are over-molded with the second plastic material wherein the Shore hardness of the second plastic material is greater than the Shore hardness of the first plastic material. Thereby a multi-component plastic part is formed showing an excellent bonding. The good adhesion between the first and the second plastic material is achieved without assembling, activating of the contact surfaces or the need of undercuts to connect both components. That allows a high material flexibility, in particular as also material combinations can be bonded which would not adhere to each other in reverse injection molding order. Thus, the geometry of the molded article, in particular the toothbrush, does not comprise any bonding restrictions.

During the over-molding of the first plastic material with the second plastic material the first plastic material may be a partially molten. Due to the partial melting the bonding strength of the two plastic components is further increased. In addition or alternatively, the first and the second plastic material may be mixed at the contact surface at least partially. The mixed contact surface allows bonding of plastic components which do not adhere to each other otherwise.

In addition or alternatively, the first and the second plastic material are injected from the same site of the molding device. In particular, the nozzle for injecting the first and the second plastic material may be arranged at an identical position of the molding device. Such an arrangement may reduce costs for the molding tool.

According to the method as disclosed herein the first plastic material having a minor Shore hardness is injected first and over-molded with the second plastic material having a greater Shore hardness. Thereby, a short cooling time can be chosen between the first and the second injection step. For example, the first plastic material must not be hardened completely, but it is sufficient if the first plastic material hardens enough so that it does not change the geometric outline during the over-molding with the second plastic material. For example the cooling time between the injection of the first and the second plastic material may be less than about 10 seconds, or less than about 5 seconds, or less than about 2 seconds.

The bristle tuft(s) may be inserted into the cleaning element carrier as a fused tuft or as a plurality of filaments. For combining the filament ends the latter may be subjected to heat in order to molten the filaments partially. Thereby a round thickening is formed. Then, the molten ends may be subjected to any kind of plunger to form a flat and even structure. Melting and flattening may be performed in one step using a heated plunger. Thus, the method may include the step of heating the ends of bristle filaments to form a thickening and flattening the thickening by pressing a flattening tool, for example a plunger, against the thickening. Thereby, a gap between the thickening and the cleaning element carrier has to be remained so that the second material may flow around the thickenings during injection molding. If the thickening comes in direct contact with the surface of the cleaning element carrier the surface of the cleaning element carrier may be moved away from the thickening in order to re-establish the gap needed for embedding the thickenings securely into the brush head.

Brush heads, toothbrush heads or parts thereof or toothbrushes produced by the method as disclosed herein can be used for manufacturing any kind of manual or electric toothbrushes. The method as disclosed herein can also be used for sealing or packaging or may be used in composites and many other multi-component industrial injection molding appliances.

In the following, a detailed description of several example embodiments will be given. It is noted that all features described in the present disclosure, whether they are disclosed in the previous description of more general embodiments or in the following description of example embodiments, even though they may be described in the context of a particular embodiment, are of course meant to be disclosed as individual features that can be combined with all other disclosed features as long as this would not contradict the gist and scope of the present disclosure. In particular, all features disclosed for either one of the method of producing the brush head or the brush head itself may also be applied to the other one, if applicable.

FIG. 1 shows an example embodiment of a molding tool 30, wherein a multi-component plastic part, for example, a toothbrush head may be molded. The molding cavity is formed from a first molding half 32 and a second molding half 34. A first plastic material 12 is injected into the cavity and over-molded with a second plastic material 16, wherein the Shore hardness of the second plastic material is greater than the Shore hardness of the first plastic material. At the contact surface 18 the first and the second plastic material are mixed at least partially. The contact surface 18 is an essentially unstructured flat layer.

Figure 2:
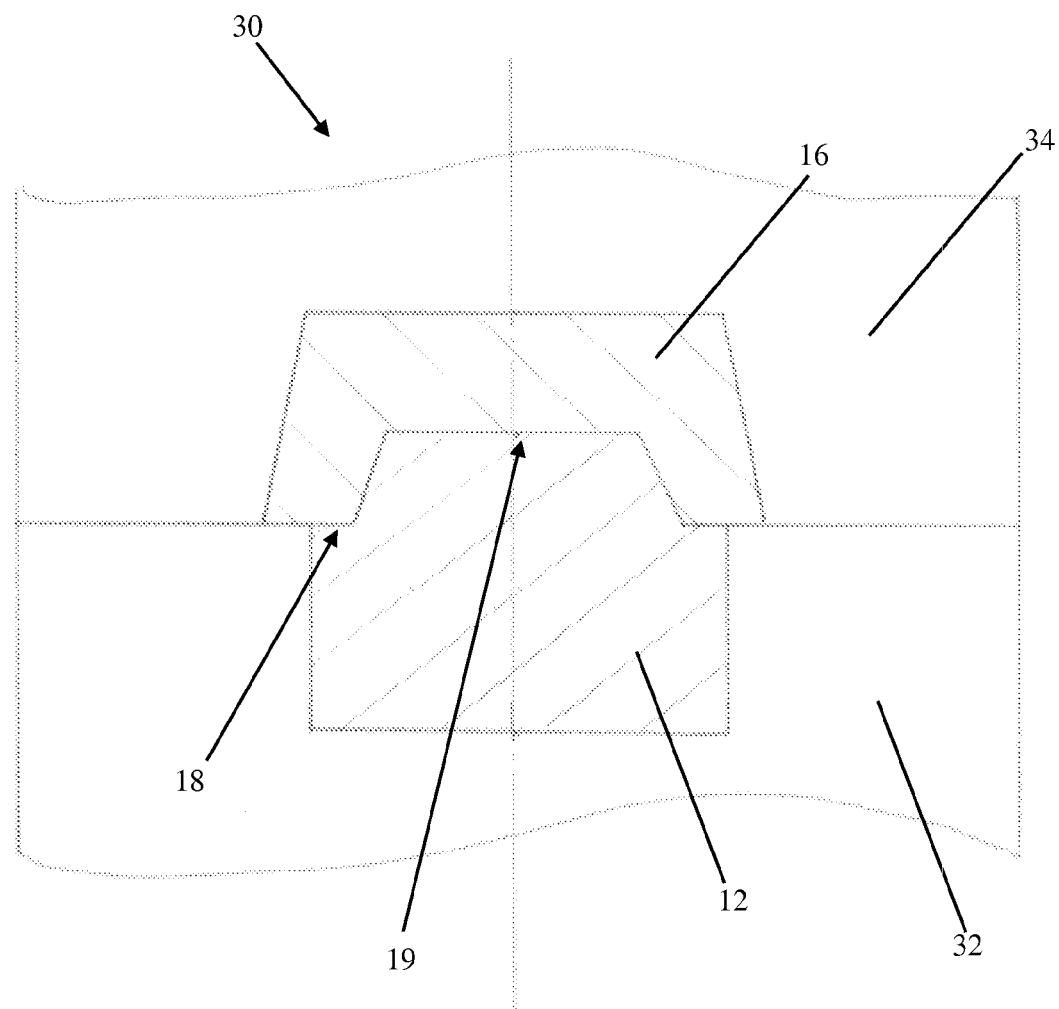
FIG. 2 shows a schematic side view of an injection mold forming a cavity for a first plastic mold part comprising a protrusion which is over-molded with a second plastic material to form a multi- component plastic mold part according to embodiments shown and described herein.

FIG. 2 shows another example embodiment of a molding tool 30, wherein a multi-component plastic part, for example, a toothbrush head may be molded. Features that are in common with the molding tool shown before in FIG. 1 are designated with the same reference numerals. The molding cavity is formed from a first molding half 32 and a second molding half 34. Into the cavity formed a first plastic material 12 is injected, wherein the first plastic material 12 is injected in such that a protrusion 19 is formed which reaches into the cavity formed by the second molding half 34. Then the first plastic material 12 is over-molded with a second plastic material 16, wherein the Shore hardness of the second plastic material is greater than the Shore hardness of the first plastic material. At the contact surface 18 the first and the second plastic material are mixed at least partially. Due to the protrusion 19 formed in the first molding step the contact surface 18 is not located completely in the contact plane of the first 32 and second 34 molding half, but is located partially in the cavity formed by the second molding half 34.

Figure 3:
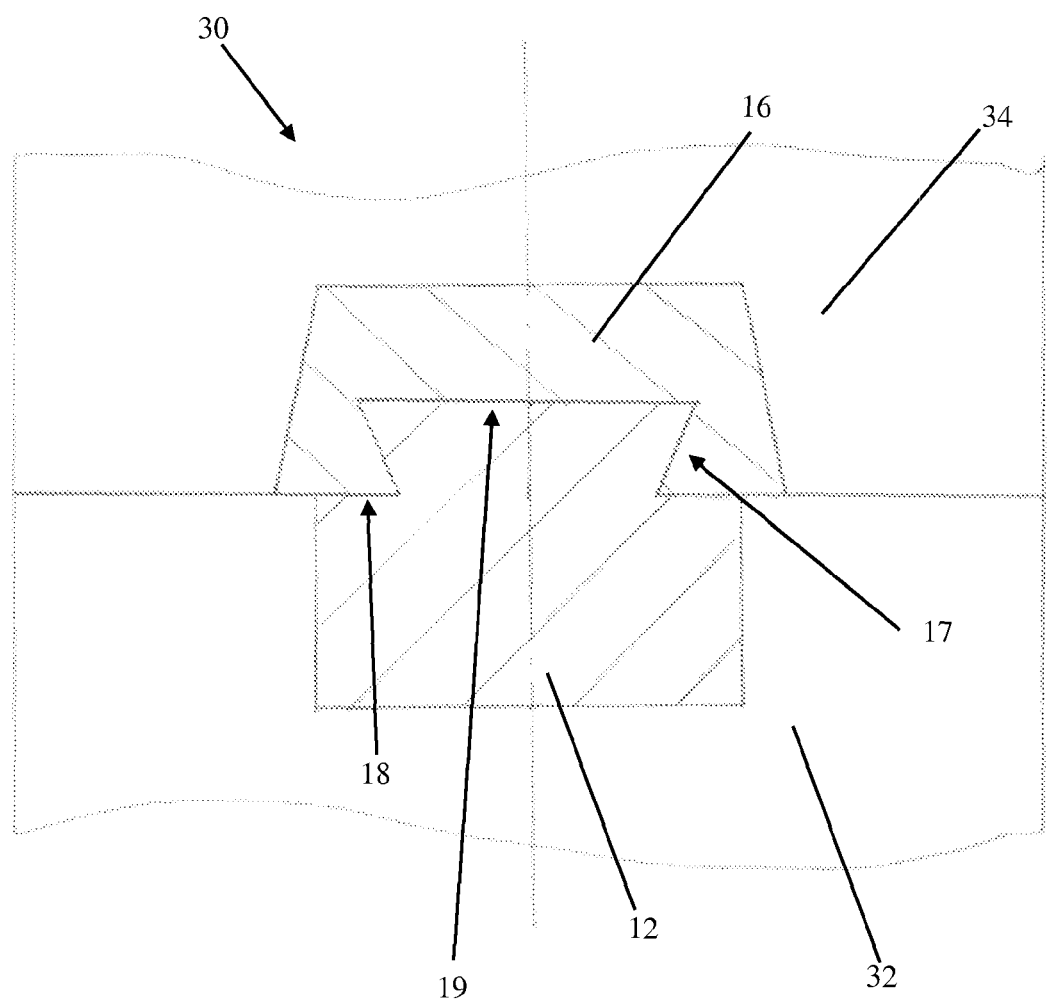
FIG. 3 shows a schematic side view of an injection mold forming a cavity for a first plastic mold part which is over-molded with a second plastic material to form multi-component plastic mold part comprising undercuts according to embodiments shown and described herein.

FIG. 3 shows another example embodiment of a molding tool 30, wherein a multi-component plastic part, in particular a toothbrush head may be molded. Features that are in common with the molding tool shown before in FIGS. 1 and 2 are designated with the same reference numerals. The molding cavity is formed from a first molding half 32 and a second molding half 34. Into the cavity formed a first plastic material 12 is injected, wherein the first plastic material 12 is injected in such that a protrusion 19 is formed which reaches into the cavity formed by the second molding half 34. The protrusion 19 is formed in such that under-cuts 17 are formed during the over-molding of the first plastic material 12 with a second plastic material 16, wherein the Shore hardness of the second plastic material is greater than the Shore hardness of the first plastic material. At the contact surface 18 the first and the second plastic material are mixed at least partially. Due to the under-cut 17 formed the bonding force between the first plastic material 12 and the second plastic material 16 is increased by a mechanical retention force.

If the multi-component plastic part formed in a molding tool according to FIGS. 1 to 3 is a toothbrush head, elastomeric cleaning elements may be formed from the first plastic material 12 and the brush head may be formed from the second plastic material 16. The first plastic material 12 may be a thermoplastic elastomer having a Shore A hardness in the range from about 35 to about 45 and the second plastic material may be a polypropylene having a Shore D hardness in the range from about 40 to about 80.

FIGS. 4 and 5 show toothbrush heads 10 or sections thereof that are connectable with any toothbrush neck 20 and any toothbrush handle to form a toothbrush. These heads 10 are equally suitable for purely manual toothbrushes and electrically powered ones. Each of the features of the toothbrush heads 10 shown in these embodiments can be designed in reduced form or in a different combination than those represented. The cleaning elements comprise at least one elastomeric cleaning element 12a which is made from the first plastic material 12 and which is over-molded with the second plastic material 16. Thereby the at least one elastomeric cleaning element 12a is embedded into the second plastic material 16.

Figure 4A:
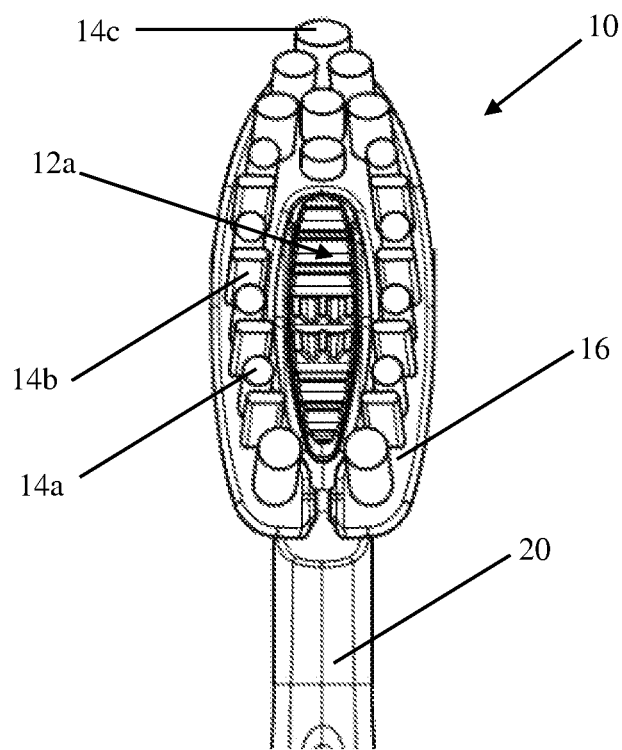
FIG. 4A shows a schematic top view of the cleaning side of an example toothbrush head having several types of cleaning elements comprising at least one elastomeric cleaning element according to embodiments shown and described herein.

FIG. 4A shows a schematic top view of the cleaning side of an example toothbrush head 10 having several types of cleaning elements including at least one elastomeric cleaning element 12a in combination with bristle tuft cleaning elements 14a, 14b, 14c. The cleaning elements may protrude rectangular from the brush head 10 or may be inclined with respect to the surface of the brush head 10 in any direction. The bristle tuft cleaning elements 14a, 14b, 14c show different tuft geometries, namely round tufts 14a, elongated rectangular tufts 14b or oval shaped tufts 14c. The bristles in the bristle tufts 14a, 14b, 14c are made, for example, from polyamid. The elastomeric cleaning element 12a is made from the first plastic material 12 by injection molding. The first plastic material 12 may be a thermoplastic elastomer having a Shore A hardness of from about 25 to about 35, wherein the Shore A hardness chosen depends on the geometry of the elastomeric cleaning elements. The bristle tuft cleaning elements 14a, 14b, 14c may be introduced before or after the injection of the first plastic material 12 into the mold. Then the mold carrying the bristle tuft cleaning elements and the elastomeric cleaning elements is used to provide the cleaning elements to the molding cavity during injection of the brush head material. The brush head 10 is formed by injection molding from the second plastic material 16 thereby over-molding the bristles tuft cleaning elements 14a, 14b, 14c and the elastomeric cleaning element 12a. The second plastic material 16 may be a polypropylene having a Shore D hardness in the range of about 50 to about 60.

Figure 4B:
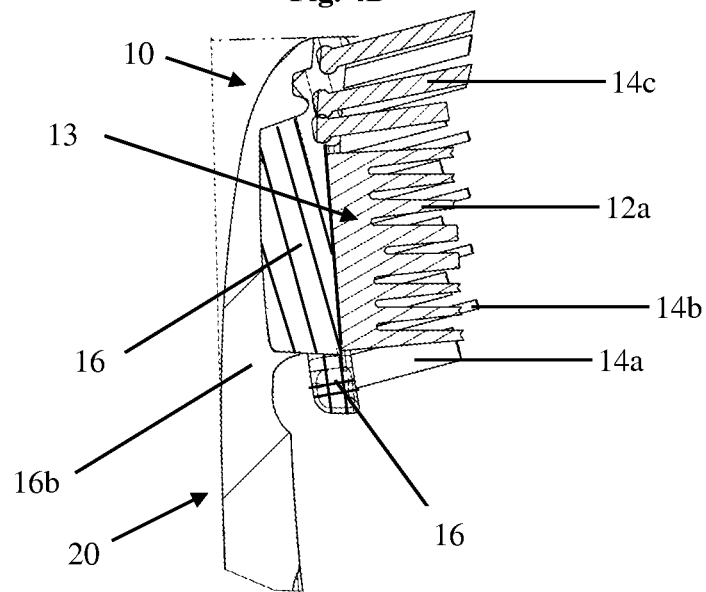
FIG. 4B shows a schematic longitudinal cross-sectional representation of the toothbrush head shown in FIG. 4A.

FIG. 4B shows a schematic longitudinal cross-sectional representation of the toothbrush head 10 shown in FIG. 4A. The bristle tuft cleaning elements 14a, 14b, 14c are embedded into the second plastic material 16 forming the toothbrush head 10. The elastomeric cleaning element 12a includes a base area 13 from which the elastomeric cleaning elements 12a protrude. The base area 13 was over-molded with the second plastic material 16 so that the elastomeric cleaning element 12a is securely connected with the second plastic material 16. The toothbrush head 10 shown in FIG. 4B includes two parts 16, 16a. The material 16 used to embedd the bristle tufts 14 and the elastomeric cleaning element 12a may be also used to form the neck 20. In addition or alternatively, a slightly different second material 16b may be used to form the neck of the brush head 10. For example the second palstic material 16 may be a polypropylene having a Shore D hardness in the range of about 50 to about 60 and the material 16b may be a polypropylene having a different Shore hardness or a polypropylene having the same Shore hardness, but another colour or a different plastic material.

Figure 4C:
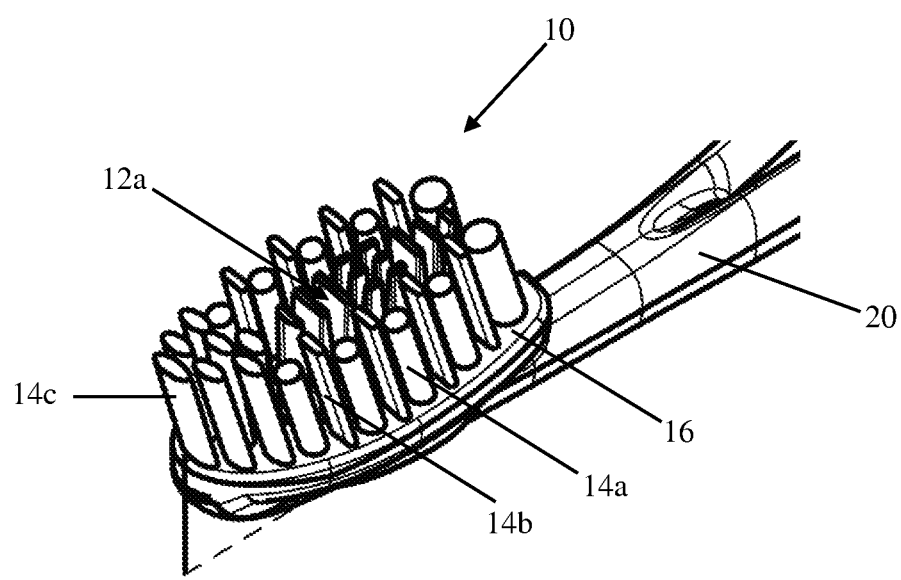
FIG. 4C shows a schematic perspective representation of the toothbrush head shown in FIG. 4A.

FIG. 4C shows a schematic perspective representation of the toothbrush head 10 shown in FIG. 4A. The elastomeric cleaning element 12a and the bristle tuft cleaning elements 14a, 14b, 14c are over-molded with the second material 16 to form the toothbrush head 10. The toothbrush head 10 may be connected to a handle (not shown) by the neck portion 20.

Figure 5A:
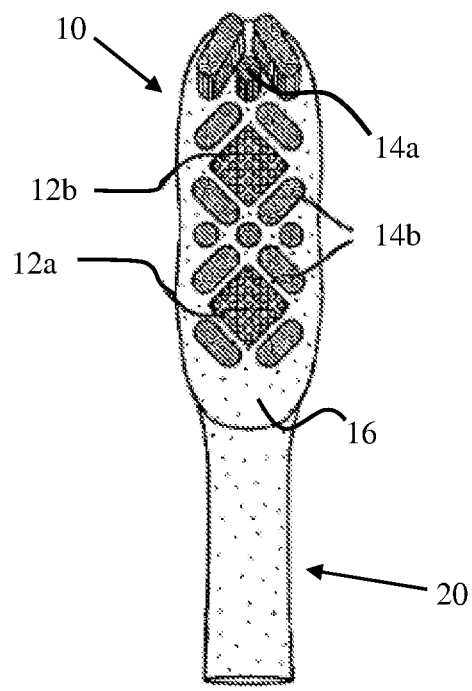
FIG. 5A shows a schematic top view of the cleaning side of another example toothbrush head having several types of cleaning elements comprising at least one elastomeric cleaning element according to embodiments shown and described herein.

FIG. 5A shows a schematic top view of the cleaning side of another example toothbrush head 10 having several types of cleaning elements comprising two elastomeric cleaning elements 12a, 12b in combination with bristle tuft cleaning elements 14a, 14b. The cleaning elements may protrude rectangular from the brush head 10 or may be inclined with respect to the surface of the brush head 10 in any direction. The bristle tuft cleaning elements 14a, 14b show different tuft geometries, namely round tufts 14a and elongated rectangular tufts 14b. The bristles in the bristle tufts 14a, 14b are made, for example, from polyamid. The elastomeric cleaning elements 12a, 12b are made from the first plastic material 12 by injection molding. The first plastic material 12 may be a thermoplastic elastomer having a Shore A hardness in the range of about 40 to about 50. The bristle tuft cleaning elements 14a, 14b may be introduced before or after the injection of the first plastic material 12 into the mold. Then the mold carrying the bristle tuft cleaning elements and the elastomeric cleaning elements is used to provide the cleaning elements to the molding cavity during injection of the brush head material. The brush head 10 is formed by injection molding from the second plastic material 16 thereby over-molding the bristles tuft cleaning elements 14a, 14b and the elastomeric cleaning elements 12a, 12b. The second plastic material 16 may be a polypropylene having a Shore D hardness in the range of about 55 to about 65.

Figure 5B:
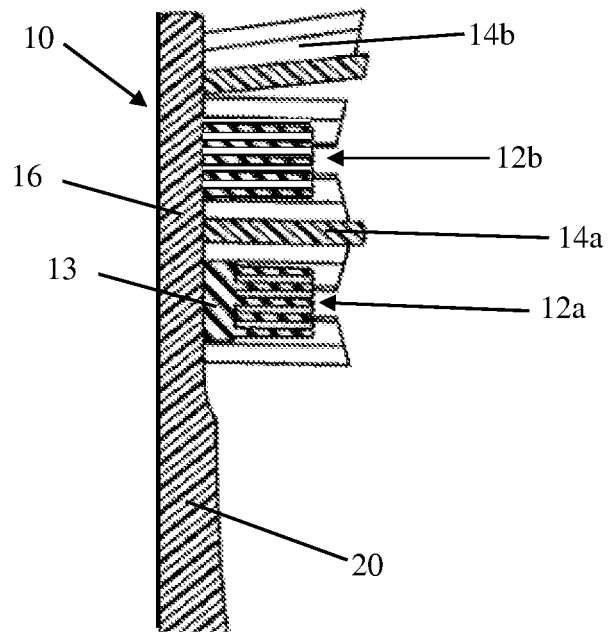
FIG. 5B shows a schematic longitudinal cross-sectional representation of the toothbrush head shown in FIG. 5A.

FIG. 5B shows a schematic longitudinal cross-sectional representation of the toothbrush head 10 shown in FIG. 5A. The bristle tuft cleaning elements 14a, 14b are embedded into the second plastic material 16 forming the toothbrush head 10 and the neck 20. The elastomeric cleaning element 12a comprise a base area 13 from which the elastomeric cleaning elements 12a protrude. The base area 13 was over-molded with the second plastic material 16 so that the elastomeric cleaning element 12a is securely connected with the second plastic material 16. The elastomeric cleaning elements 12b protrude individually from the brush head 10. Thus, the elastomeric cleaning elements 12b were over-molded individually with the second plastic material 16 so that the elastomeric cleaning elements 12b are securely connected in the second plastic material 16.

FIG. 5C shows a schematic perspective representation of the toothbrush head 10 shown in FIG. 5A. The elastomeric cleaning elements 12a, 12b and the bristle tuft cleaning elements 14a, 14b are over-molded with the second material 16 to form the toothbrush head 10. The toothbrush head 10 may be connected to a handle (not shown) by the neck portion 20.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What we claim is:

1. A toothbrush comprising:
a brush head comprising cleaning elements comprising an elastomeric cleaning element and one or more bristle tuft cleaning elements;
a handle; and
a neck connecting the brush head and the handle;
wherein the elastomeric cleaning element comprises a first plastic material having a Shore A hardness;
wherein the elastomeric cleaning element is embedded into a second plastic material having Shore D hardness by over-molding;
wherein the second plastic material and the elastomeric cleaning element interface at a contact surface;
wherein the first and second plastic material are at least partially mixed at the contact surface;
wherein the Shore D hardness is greater than the Shore A hardness; and
wherein the brush head is formed from the second plastic material during over-molding of the one or more cleaning elements.

2. The toothbrush according to claim 1, wherein the Shore A hardness of the first plastic material is in the range from about 10 to about 80.

3. The toothbrush according to claim 2, wherein the first plastic material is a thermoplastic elastomer.

4. The toothbrush according to claim 1, wherein the Shore D hardness of the second plastic material is in the range from about 30 to about 90.

5. The toothbrush according to claim 1, wherein the second plastic material is selected from the group consisting of polypropylene, polyethylene, polyoxymethylene, polyethyleneterephthalate, a polyamide, or a mixture thereof.

6. The toothbrush according to claim 1, wherein the one or more elastomeric cleaning elements is selected from the group consisting of a nub, a pin, a fin, a wall, a bar, a gutter, a curve, a circle, a textured element, a polishing element, a tongue cleaning element or a combination thereof.

7. The toothbrush according to claim 1, wherein more than one elastomeric cleaning element are positioned on a layer made from the first plastic material.

8. The toothbrush according to claim 1, wherein the part of the brush head formed from the second plastic material is a plate having the outer surface of the brush head.

9. The toothbrush according to claim 1, wherein the brush head further comprises a thickness wherein the thickness is less than about 5 mm.

10. A toothbrush comprising:
a brush head comprising cleaning elements comprising an elastomeric cleaning element and one or more bristle tuft cleaning elements;
a handle; and
a neck connecting the brush head and the handle;
wherein the elastomeric cleaning element consists of a first plastic material having a Shore A hardness wherein the first plastic material is selected from the group consisting of rubber, polypropylene, thermoplastic elastomers, and combinations thereof;
wherein the elastomeric cleaning element is embedded into a second plastic material having Shore D hardness by over-molding;
wherein the Shore D hardness is greater than the Shore A hardness; and
wherein the brush head is formed from the second plastic material during over-molding of the one or more cleaning elements.

11. The toothbrush of claim 10 wherein the second plastic material and the elastomeric cleaning element interface at a contact surface and wherein the first and second plastic material are at least partially mixed at the contact surface.

12. A toothbrush comprising:
a brush head comprising cleaning elements comprising an elastomeric cleaning element and one or more bristle tuft cleaning elements;
a handle; and
a neck connecting the brush head and the handle;
wherein the elastomeric cleaning element comprises a first plastic material having a Shore A hardness;
wherein the elastomeric cleaning element is embedded into a second plastic material having Shore D hardness by over-molding;
wherein the Shore D hardness is greater than the Shore A hardness; and
wherein the brush head is formed from the second plastic material during over-molding of the one or more cleaning elements.

* * * * *